US009665489B2

(12) United States Patent
Wang et al.

(10) Patent No.: US 9,665,489 B2
(45) Date of Patent: May 30, 2017

(54) METHODS OF SELECTING AVAILABLE CACHE IN MULTIPLE CLUSTER SYSTEM

(71) Applicant: QUALCOMM Incorporated, San Diego, CA (US)

(72) Inventors: Feng Wang, San Diego, CA (US); Bohuslav Rychlik, San Diego, CA (US); George Patsilaras, Del Mar, CA (US); Andrew Edmund Turner, San Diego, CA (US); Anwar Quinones Rohillah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/619,628

(22) Filed: Feb. 11, 2015

(65) Prior Publication Data

US 2016/0232091 A1    Aug. 11, 2016

(51) Int. Cl.
*G06F 12/08* (2016.01)
*G06F 12/084* (2016.01)
(Continued)

(52) U.S. Cl.
CPC ........ *G06F 12/084* (2013.01); *G06F 12/0851* (2013.01); *G06F 12/0875* (2013.01); *G06F 12/0897* (2013.01); *G06F 2212/1021* (2013.01); *G06F 2212/283* (2013.01); *G06F 2212/608* (2013.01); *Y02B 60/1225* (2013.01)

(58) Field of Classification Search
CPC ............... G06F 12/084; G06F 12/0875; G06F 12/0897; G06F 12/0851; G06F 12/0868; G06F 12/0871; G06F 12/12; G06F 12/0804; G06F 12/121; G06F 12/127; G06F 2212/1021; G06F 2212/283; G06F 2212/608; G06F 2212/284; G06F 2212/69; G06F 2212/6046; G06F 9/5016
See application file for complete search history.

(56) References Cited

U.S. PATENT DOCUMENTS 6,449,671 B1 * 9/2002 Patkar ................ G06F 12/0806
710/107
8,380,947 B2    2/2013 Chiu et al.
(Continued)

OTHER PUBLICATIONS

International Search Report and Written Opinion—PCT/US2015/064895—ISA/EPO—Feb. 25, 2016.

*Primary Examiner* — Michael Krocheck
(74) *Attorney, Agent, or Firm* — The Marbury Law Group, PLLC

(57) ABSTRACT

Aspects include computing devices, systems, and methods for implementing selecting an available shared cache memory as a victim cache. The computing device may identify a remote shared cache memory with available shared cache memory space for use as the victim cache. To select the appropriate available shared cache memory, the computing device may retrieve data for the identified remote shared cache memory or a processor cluster associated with the identified remote shared cache memory relating to a metric, such as performance speed, efficiency, or effective victim cache size. Using the retrieved data, the computing device may determine the identified remote shared cache memory to use as the victim cache and select the determined remote shared cache memory to use as the victim cache.

16 Claims, 13 Drawing Sheets

(51) Int. Cl.
*G06F 12/0846* (2016.01)
*G06F 12/0875* (2016.01)
*G06F 12/0897* (2016.01)

(56) References Cited

U.S. PATENT DOCUMENTS

| | | | |
|---|---|---|---|
| 8,443,147 | B2 | 5/2013 | Brewer et al. |
| 8,522,245 | B2 | 8/2013 | Chung |
| 8,738,860 | B1* | 5/2014 | Griffin ................ G06F 12/0897 |
| | | | 711/122 |
| 8,782,102 | B2 | 7/2014 | Qiao et al. |
| 2003/0009640 | A1* | 1/2003 | Arimilli .............. G06F 12/0888 |
| | | | 711/147 |
| 2006/0184742 | A1* | 8/2006 | Clark .................... G06F 12/127 |
| | | | 711/133 |
| 2006/0224833 | A1 | 10/2006 | Guthrie et al. |
| 2008/0091880 | A1* | 4/2008 | Vishin ................ G06F 12/0806 |
| | | | 711/122 |
| 2008/0250212 | A1* | 10/2008 | Asaro ................ G06F 12/0607 |
| | | | 711/157 |
| 2009/0307434 | A1* | 12/2009 | Sivaramakrishnan G06F 12/0607 |
| | | | 711/147 |
| 2010/0030970 | A1* | 2/2010 | Qureshi .............. G06F 12/0802 |
| | | | 711/128 |
| 2013/0282950 | A1 | 10/2013 | Bert et al. |
| 2014/0181837 | A1* | 6/2014 | Vajapeyam ........... G06F 9/5033 |
| | | | 718/107 |

* cited by examiner

METHODS OF SELECTING AVAILABLE CACHE IN MULTIPLE CLUSTER SYSTEM

BACKGROUND

The increasing demand for performance and features in a broad array of computing devices has led manufactures to include multiple central processor units (CPUs) in computing devices to handle a greater number of capabilities and heavier workloads while executing faster than previous generations. Some architectures include CPUs arranged into clusters for executing different tasks and supporting different capabilities. A computing device may include a multi-cluster CPU system to handle the demands of the software and subsystems of the computing device. The number of CPUs can only advance the performance of the computing device if the CPUs can access stored code and data with speeds comparable to their processing speed. Too many CPUs requesting access to a cache memory can cause a performance bottleneck.

To avoid creating this performance bottleneck, each CPU cluster may include its own cache memory, for example an L2 cache. In many instances, not all of the CPU clusters of a computing device may be active, or the cache of a CPU cluster may not be fully utilized. Existing cache coherency protocols support sharing of data among L2 caches of different CPU clusters. However, these cache coherency protocols fail to fully exploit the available L2 cache resources in the multi-cluster CPU system. The preferred L2 cache to be leveraged for supporting other active CPU clusters would be the L2 cache of the multi-cluster CPU system having both the lowest latency and the highest availability. This preferred circumstance is not always present when looking to leverage other L2 cache resources for a CPU cluster. Further, even combining the highest availability and lowest latency may not provide the combination with the best performance results.

SUMMARY

The methods and apparatuses of various aspects provide circuits and methods of selecting from among a plurality of shared cache memories a remote shared cache memory to use as a victim cache. Aspect methods may include identifying among the plurality of shared cache memories those remote shared cache memories with space available for use as the victim cache, retrieving, for each of the identified remote shared cache memories or a processor cluster associated with each of the identified remote shared cache memories, data relating to a metric for selecting a remote shared cache memory as the victim cache, determining a suitability of each of the identified remote shared cache memories for use as the victim cache based on the metric, and selecting one of the identified remote shared cache memories to use as the victim cache based on the determination.

In an aspect, the metric for selecting a remote shared cache memory as the victim cache may include a performance speed metric, retrieving, for each of the identified remote shared cache memories or a processor cluster associated with each of the identified remote shared cache memories, data relating to a metric for selecting a remote shared cache memory as the victim cache may include retrieving a hit rate of the identified remote shared cache memory, a miss rate for the identified remote shared cache memory, a latency of the processor cluster, and a latency for a main memory, and determining a suitability of each of the identified remote shared cache memories for use as the victim cache based on the metric may include calculating a performance speed indicator for the identified remote shared cache memory and comparing the performance speed indicator for the identified remote shared cache memory to a threshold or another performance speed indicator for another identified remote shared cache memory.

An aspect method may further include interleaving memory addresses of the identified remote shared cache memory selected for use as the victim cache with another remote shared cache memory selected for use as the victim cache based on an address interleaving scheme.

In an aspect, calculating a performance speed indicator for the identified remote shared cache memory may include using the equation: the hit rate of the identified remote shared cache memory multiplied by the latency of the processor cluster to which is added the miss rate of the identified remote shared cache memory multiplied by the latency of the main memory.

In an aspect, the metric for selecting a remote shared cache memory as the victim cache may include an efficiency metric, retrieving, for each of the identified remote shared cache memories or a processor cluster associated with each of the identified remote shared cache memories, data relating to a metric for selecting a remote shared cache memory as the victim cache may include retrieving state data of the processor cluster, and determining a suitability of each of the identified remote shared cache memories for use as the victim cache based on the metric may include comparing the state data of the processor cluster to a threshold or state data of another processor cluster.

An aspect method may further include interleaving memory addresses of the identified remote shared cache memory selected for use as the victim cache with another remote shared cache memory selected for use as the victim cache based on an address interleaving scheme.

In an aspect, retrieving state data of the processor cluster may include retrieving at least one of a temperature, a current leakage, a power usage, or an operation frequency.

In an aspect, the metric for selecting a remote shared cache memory as the victim cache may include an effective victim cache size metric, retrieving, for each of the identified remote shared cache memories or a processor cluster associated with each of the identified remote shared cache memories, data relating to a metric for selecting a remote shared cache memory as the victim cache may include retrieving at least one of an available shared cache memory size of the identified remote shared cache memory or a memory latency for the identified remote shared cache memory, determining a suitability of each of the identified remote shared cache memories for use as the victim cache according to the metric may include at least one of the available shared cache memory size of the identified remote shared cache memory or the memory latency for the identified remote shared cache memory to a threshold or a same type of data for another identified remote shared cache memory, and the aspect method may further include interleaving memory addresses of the available shared cache memory selected for use as the victim cache with another available shared cache memory selected for use as the victim cache based on an address interleaving scheme.

An aspect method may further include interleaving memory addresses of the identified remote shared cache memory selected for use as the victim cache with another remote shared cache memory selected for use as the victim cache based on an address interleaving scheme.

An aspect method may further include determining the address interleaving scheme based on a ratio of available shared cache memory size between the identified remote shared cache memory and the other remote shared cache memory or a ratio of memory latency between the identified remote shared cache memory and the other remote shared cache memory, in which the address interleaving scheme includes one of an arbitrary address interleaving scheme, a symmetrical n-way address interleaving scheme, and an asymmetrical address interleaving scheme.

An aspect method may further include determining the metric for selecting a remote shared cache memory as the victim cache.

An aspect includes a computing device, having a plurality of processor clusters communicatively connected to each other, a first processor cluster of the plurality of processor clusters assigned an execution process, a plurality of shared cache memories each communicatively connected to at least one of the plurality of processor clusters, and a processor communicatively connected to the plurality of processor clusters and configured with processor-executable instructions to perform operations of one or more aspect methods described above.

An aspect includes a computing device having means for performing the functions of one or more aspect methods described above.

An aspect includes a non-transitory processor-readable medium having stored thereon processor-executable instructions configured to cause a processor to perform operations of one or more aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
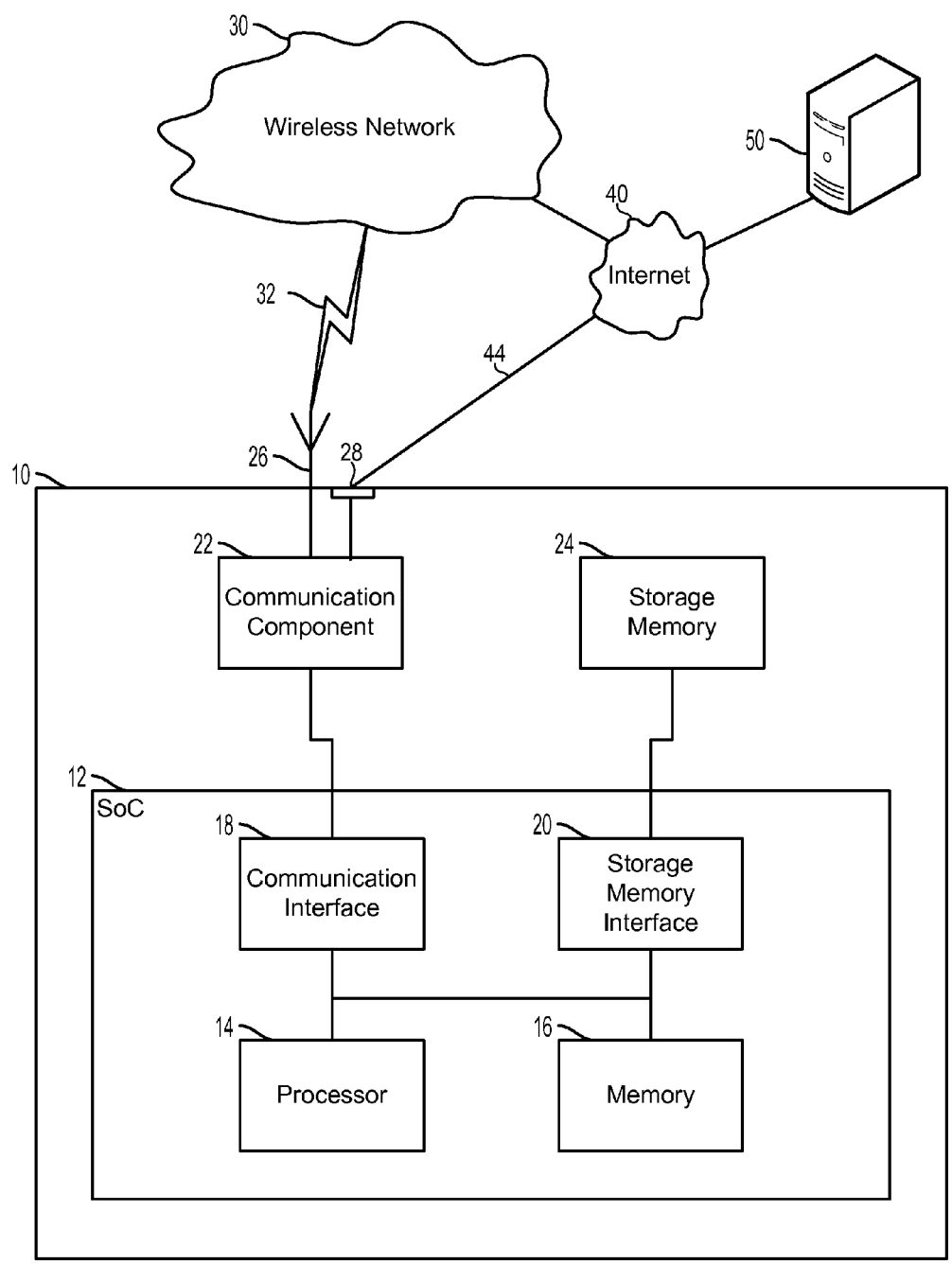
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a multi-core programmable processor. A computing device includes one or more processors within the computing device, and thus a reference to a computing device performing an operation encompasses one or more processors within the device performing the operation. While the various aspects are particularly useful for mobile computing devices, such as smartphones, which have limited memory and battery resources, the aspects are generally useful in any electronic device that implements a plurality of memory devices and a limited power budget in which reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Aspects include methods and computing devices implementing such methods for improved exploitation of available cache resources in a multi-cluster CPU system. The various aspects may apply to any type of cache memory (e.g., L1 cache memory, L2 cache memory, L3 cache memory, L4 cache memory, etc.), and therefore references to L2 cache memory are used for ease of explanation as an example type of cache memory and are not meant to limit the scope of the claims unless specifically recited. In an aspect, cache resource exploitation may be improved by selecting remote L2 cache memories for use as victim caches for processes with high L2 cache demands. A remote L2 cache memory may be selected based on latency performance calculations relating to accesses of the remote L2 cache memory and a main memory. Aspects may improve the use of multiple L2 cache memories by using address interleaving to increase the effective capacity of the L2 cache memories. Aspects may conserve power by using multiple L2 cache memories based on various states of a processor cluster executing other threads or processes. Aspects may improve the effectiveness of a victim cache mode using the L2 cache memory of one or more other processor clusters.

In an aspect, the computing device may determine the performance of each L2 cache memory based on a combination of performance metrics. Such performance metrics may include latencies adjusted by successful remote L2 cache memory accesses. For example, the performance of a remote L2 cache memory may be determined based on a calculation of a remote L2 cache memory hit rate times a cluster latency plus a remote L2 cache memory miss rate times a main memory latency. The latency of successful accesses of the remote L2 cache memory combined with the latency of unsuccessful accesses of the remote L2 cache memory may give a performance evaluation of the overall latency for using the remote L2 cache memory. The lower the latency for using the remote L2 cache memory the more likely the remote L2 cache memory can be used as a victim cache to support a process executed on another processor cluster.

In an aspect, to improve the use of multiple L2 cache memories, address interleaving may be used to increase the effective capacity and throughput of the L2 cache memories. Available portions of multiple remote L2 caches may be interleaved so that contiguous memory access requests may be spread across the multiple remote L2 cache memories, thereby improving the victim cache throughput. The interleaving scheme may include any number of remote L2 cache memories. The interleaving scheme may be arbitrary, or based on available L2 cache memory size.

In an aspect, to improve the power efficiency, multiple L2 cache memories may be used based on various states of a processor cluster executing other threads or processes. Using more cache memory resources generally means using more power. To reduce the power cost of using multiple L2 cache memories, one or more of the remote L2 cache memories may be selected based on temperature of the processor cluster associated with the L2 cache memory, operating frequency of the processors of the processor cluster, power consumption of the processor cluster, and/or current leakage of the processors. The L2 cache memories associated with the processors with lower values for the various states may then be selected as a remote L2 cache.

Reducing the latency and increase the availability of the remote L2 cache memories for use as a remote victim cache may reduce the number of cache misses, resulting in less access to the main memory, reduced bandwidth usage, reduced memory access conflicts, and improve performance. This may increase the performance of executing the process because the access to stored information is faster and less susceptible to delays or interruptions. Also, reducing the power consumed by using the remote L2 cache memories may improve the performance by avoiding performance degradation caused by various processor states.

FIG. 1 illustrates a system including a computing device 10 in communication with a remote computing device 50 suitable for use with the various aspects. The computing device 10 may include an SoC 12 with a processor 14, a memory 16, a communication interface 18, and a storage memory interface 20. The computing device may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than one SoCs 12, thereby increasing the number of processors 14 and processor cores. The computing device 10 may also include processor 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together.

The memory 16 of the SoC 12 may be a volatile or non-volatile memory configured for storing data and processor-executable code for access by the processor 14. The computing device 10 and/or SoC 12 may include one or more memories 16 configured for various purposes. In an aspect, one or more memories 16 may include volatile memories such as random access memory (RAM) or main memory, or cache memory. These memories 16 may be configured to temporarily hold a limited amount of data and/or processor-executable code instructions that is requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory. In an aspect, the memories 16 may be dedicated for use by or may be shared between different processors 14 or processor cores.

In an aspect, the memory 16 may be configured to store processor-executable code, at least temporarily, that is loaded to the memory 16 from another memory device, such as another memory 16 or storage memory 24, for access by one or more of the processors 14. In an aspect, the processor-executable code loaded to the memory 16 may be loaded in response to execution of a function by the processor 14. Loading the processor-executable code to the memory 16 in response to execution of a function may result from a memory access request to the memory 16 that is unsuccessful, or a miss, because the requested processor-executable code is not located in the memory 16. In response to a miss, a memory access request to another memory device may be made to load the requested processor-executable code from the other memory device to the memory device 16. In an aspect, loading the processor-executable code to the memory 16 in response to execution of a function may result from a memory access request to another memory device, and the processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
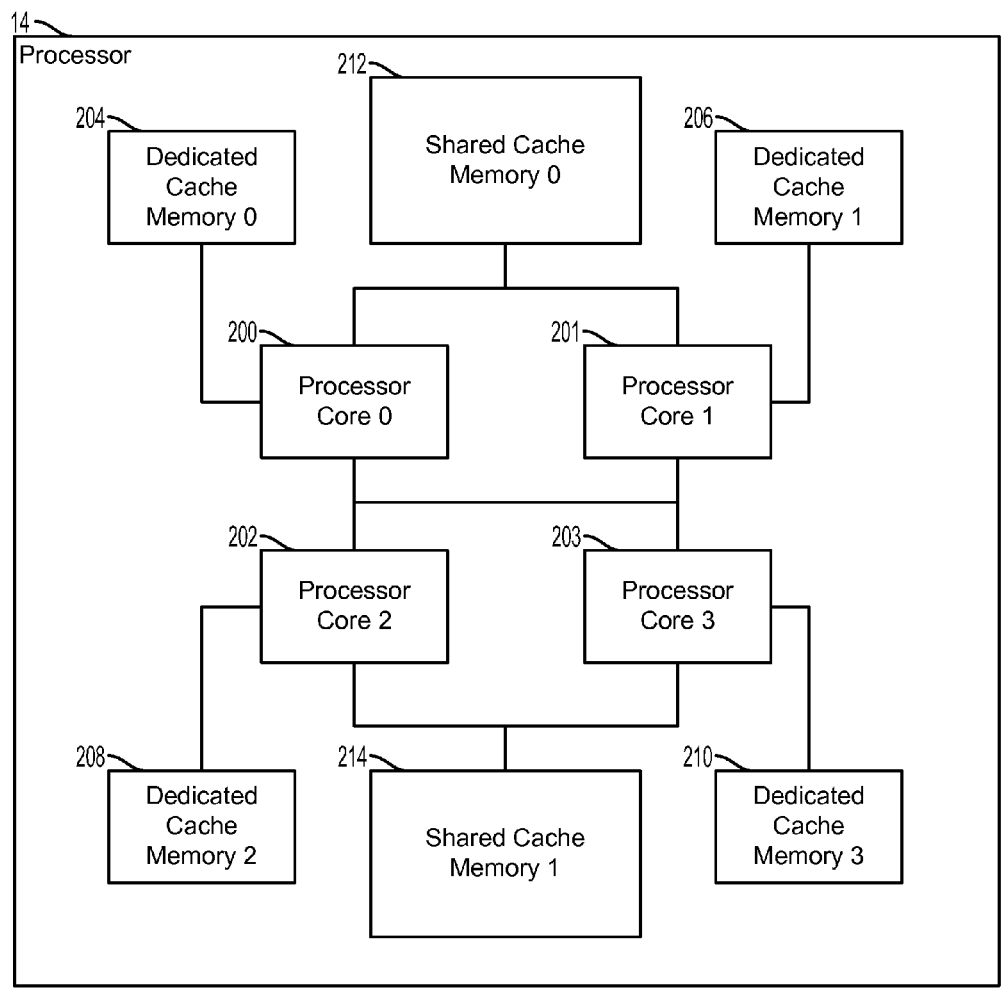
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. Example of such heterogeneous processor cores may include what are known as "big.LITTLE" architectures in which slower, low-power processor cores may be coupled with more powerful and power-hungry processor cores.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various aspects to a four-core processor system. The computing device 10, the SoC 12, or the multi-core processor 14 may individually or in combination include fewer or more than the four processor cores 200, 201, 202, 203 illustrated and described herein.

In an aspect, the processor cores 200, 201, 202, 203 may have associated dedicated cache memories 204, 206, 208, 210. Like the memory 16 in FIG. 1, dedicated cache memories 204, 206, 208, 210 may be configured to temporarily hold a limited amount of data and/or processor-executable code instructions that is requested from non-volatile memory or loaded from non-volatile memory in anticipation of future access. The dedicated cache memories 204, 206, 208, 210 may also be configured to store intermediary processing data and/or processor-executable code instructions produced by the processor cores 200, 201, 202, 203 and temporarily stored for future quick access without being stored in non-volatile memory. The dedicated cache memories 204, 206, 208, 210 may each be associated with one of the processor cores 200, 201, 202, 203. Each dedicated cache memory 204, 206, 208, 210 may be accessed by a respective associated processor core 200, 201, 202, 203. In the example illustrated in FIG. 2, each processor core 200, 201, 202, 203 is in communication with one of the dedicated cache memories 204, 206, 208, 210 (i.e., processor core 0 is paired with dedicated cache memory 0, processor core 1 with dedicated cache memory 1, processor core 2 with dedicated cache memory 2, and processor core 3 with dedicated cache memory 3). Each processor core 200, 201, 202, 203 is shown to be in communication with only one dedicated cache memory 204, 206, 208, 210, however the number of dedicated cache memories is not meant to be limiting and may vary for each processor core 200, 201, 202, 203.

In an aspect, the processor cores 200, 201, 202, 203 may have associated shared cache memories 212, 214. The shared cache memories 212, 214 may be configured to perform similar functions to the dedicated cache memory 204, 206, 208, 210. However, the shared cache memories 212, 214 may each be in communication with more than one of the processor cores 200, 201, 202, 203 (i.e., processor core 0 and processor core 1 are paired with shared cache memory 0, and processor core 2 and processor core 3 are paired with shared cache memory 1). Each processor core 200, 201, 202, 203 is shown to be in communication with only one shared cache memory 212, 214, however the number of shared cache memories is not meant to be limiting and may vary for each processor core 200, 201, 202, 203. Similarly, each shared cache memory is shown to be in communication with only two processor cores 200, 201, 202, 203, however the number of processor cores is not meant to be limiting and may vary for each shared cache memory 212, 214. The processor cores 200, 201, 202, 203 in communication with the same shared cache memory 212, 214, may be grouped together in a processor cluster as described further herein.

Figure 3:
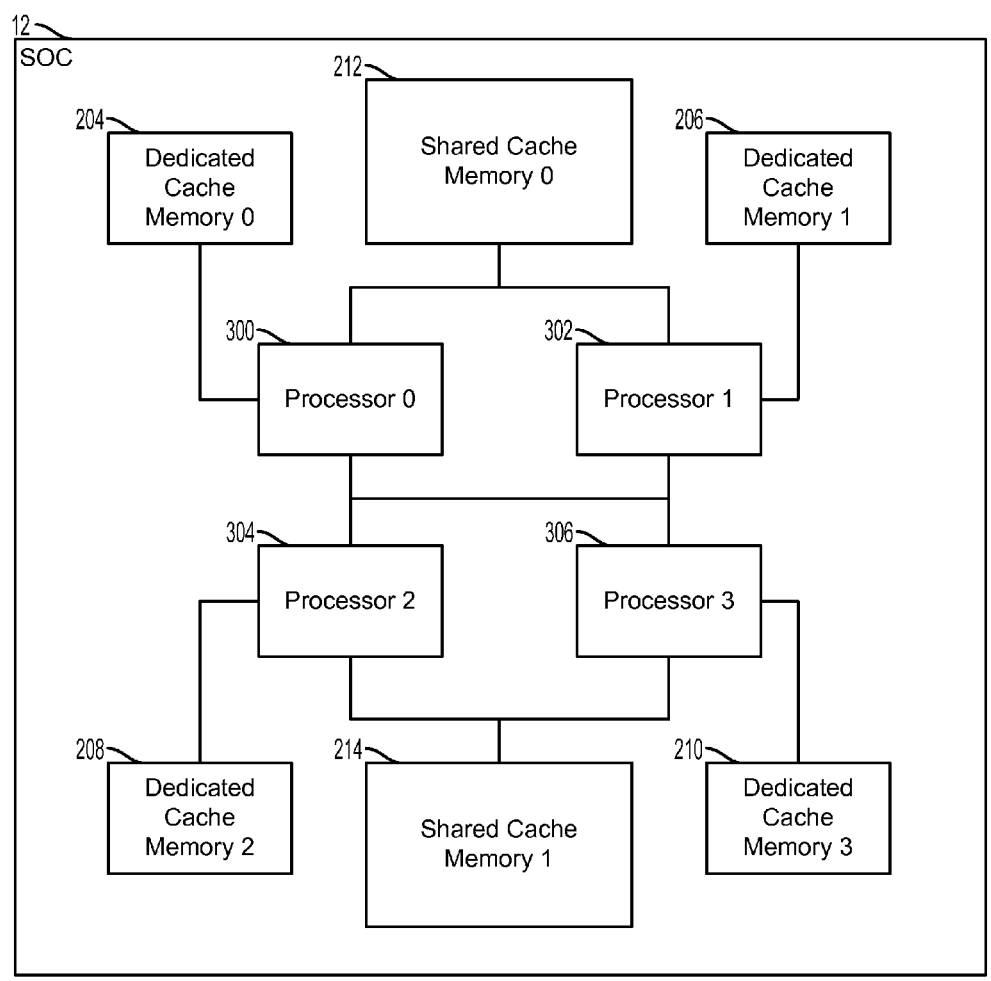
FIG. 3 is a component block diagram illustrating an example system on chip (SoC) suitable for implementing an aspect.

FIG. 3 illustrates an SoC 12 suitable for implementing an aspect. The SoC 12 may have a plurality of homogeneous or heterogeneous processors 300, 302, 304, 306. Each of the processors 300, 302, 304, 306 may be similar to the processor 14 in FIG. 2. The purposes and/or performance characteristics of each processor 300, 302, 304, 306 may determine whether the processors 300, 302, 304, 306 are homogeneous or heterogeneous in a similar manner as the processor cores 200, 201, 202, 203 in FIG. 2.

The dedicated cache memories 204, 206, 208, 210 and shared cache memories 212, 214 are also similar to the same components described in FIG. 2, however here the dedicated cache memories 204, 206, 208, 210 and shared cache memories 212, 214 are in communication with the processors 300, 302, 304, 306. The number and configuration of the components of the SoC 14 is not meant to be limiting, and the SoC 14 may include more or fewer of any of the components in varying arrangements.

In an aspect, the processors and processor cores described herein need not be located on the same SoC or processor to share a shared cache memory. The processors and processor cores may be distributed across various components while maintaining a connection to the same shared cache memory as one or more other processors or processor cores.

Figure 4:
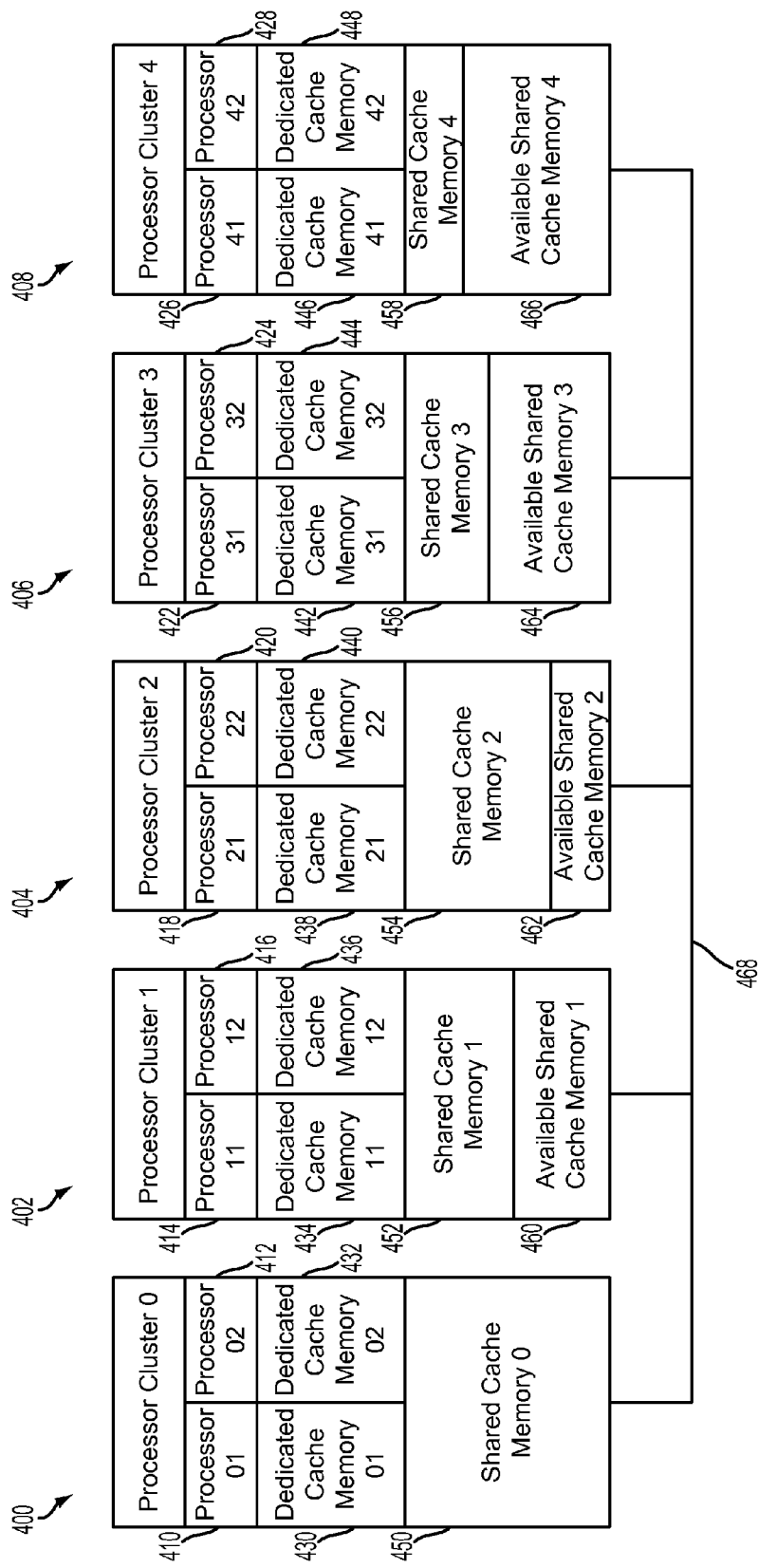
FIG. 4 is an illustration of multiple processor clusters including levels of available shared cache memory for each processor cluster in accordance with an aspect.

FIG. 4 illustrates multiple processor clusters 400, 402, 404, 406, 408 including varying levels of available shared cache memory 460, 462, 464, 466 in accordance with an aspect. The processor clusters 400, 402, 404, 406, 408 in the example shown in FIG. 4 (and later described in FIGS. 6-8, 13, and 15) are each shown to have two processors 410, 412, 414, 416, 418, 420, 422, 424, 426, 428, each associated with a dedicated cache memory 430, 432, 434, 436, 438, 440, 442, 444, 446, 448, and shared cache memory 450, 452, 454, 456, 458. For example, processor cluster 400 (processor cluster 0), includes processors 410 (processor 01), 412 (processor 02), and the processors 410, 412 are each associated with a respective dedicated cache memory 430 (dedicated cache memory 01 associated with processor 01), 432 (dedicated cache memory 02 associated with processor 02). Moreover, the processors 410, 412 are each associated with a shared cache memory 450 (shared cache memory 0 associated with processor 01 and processor 02). The processor clusters 400, 402, 404, 406, 408 may be in communication with each other via an interconnect bus 468, which may allow the processor clusters 400, 402, 404, 406, 408 to communicate data to, from, and relating to the shared cache memories 450, 452, 454, 456, 458. As noted above, these example processor clusters 400, 402, 404, 406, 408 are not meant to be limiting and may be provided with components in a variety of numbers and configurations.

One or more of the shared cache memories 450, 452, 454, 456, 458 may include a portion which is available shared cache memory 460, 462, 464, 466. In other words, portions of the shared cache memories 450, 452, 454, 456, 458 may be in use, either storing information for potential use or being accessed. Other portions of the shared cache memories 450, 452, 454, 456, 458 may be idle or available, either storing information no longer designated for use, empty, or not being accessed. The available shared cache memory 460, 462, 464, 466 is the latter portion of the shared cache memories 450, 452, 454, 456, 458. Each available shared cache memory 460, 462, 464, 466 may include varying levels of shared cache memory space as indicated by the varying sizes of the available shared cache memory 460, 462, 464, 466. The amount of shared cache memory space of each available shared cache memory 460, 462, 464, 466 may vary over time depending on the use of the shared cache memories 450, 452, 454, 456, 458.

The example illustrated in FIG. 4 shows that the processor cluster 400 does not have an available shared cache memory. In this example, the processor cluster 400 is assigned a process with high shared cache memory demand (which may also be called an execution process), meaning that the execution process uses all or nearly all of what may have been available shared cache memory for shared cache memory 450. Any of the processor clusters 400, 402, 404, 406, 408 may also be called an execution processor cluster 400, 402, 404, 406, 408 when assigned the execution process. Any of the shared cache memories 450, 452, 454, 456, 458 may also be called remote shared cache memories 450, 452, 454, 456, 458 when they are remote to the execution processor cluster 400, 402, 404, 406, 408. Further, the example shows that each of the shared cache memories 452, 454, 456, 458 includes a different level of available shared cache memory 460, 462, 464, 466 (i.e., available shared cache memory 2 is smaller than available shared cache memory 1, which is smaller than available shared cache memory 3, which is smaller than available shared cache memory 4). The location of each of the processor clusters 402, 404, 406, 408 in relation to the execution process cluster 400 may indicate a relative distance of each of the processor clusters 402, 404, 406, 408 from the execution process cluster 400. The relative distance may result in varying latencies for communications between the processor clusters 402, 404, 406, 408 and the execution process cluster 400.

Figure 5:
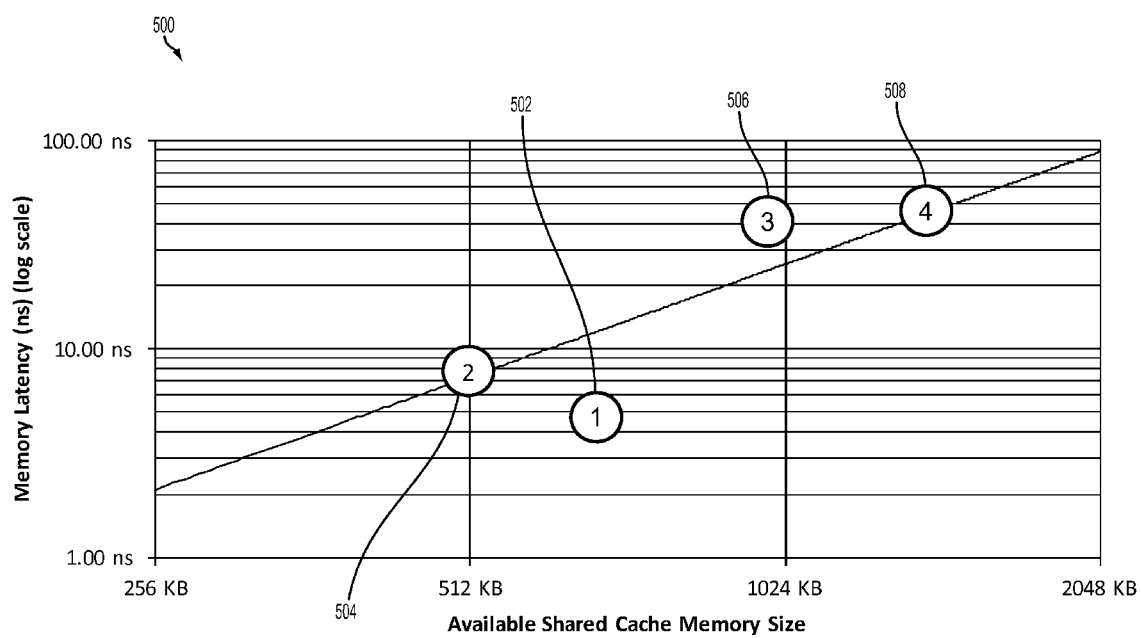
FIG. 5 is a graph illustration including plot points for multiple processor clusters in relation to an execution processor cluster in accordance with an aspect.

FIG. 5 illustrates a graph 500 of memory latency versus available shared memory cache size, including plot points 502, 504, 506, 508 for the processor clusters 402, 404, 406, 408 in relation to an execution processor cluster 400. Each plot points 502, 504, 506, 508 correlates with one of the processor clusters 402, 404, 406, 408 in FIG. 4 (i.e., plot point 1 correlates with processor cluster 1, plot point 2 with processor cluster 2, plot point 3 with processor cluster 3, and plot point 4 with processor cluster 4). The graph 500 correlates with the available shared memory cache size and distances/latencies expressed in FIG. 4. For example, the processor clusters 402 is closest in distance to execution processor cluster 400, so plot point 502 is lowest on the y-axis depicting memory latency. The further the processor clusters 404, 406, 408 are from the execution processor cluster 400, the more memory latency is shown by the corresponding plot points 504, 506, 508. Similarly, the size of the available shared cache memory 460, 462, 464, 466 for the corresponding processor cluster 402, 404, 406, 408 is shown by the corresponding plot point 502, 504, 506, 508 along the x-axis. The values shown on the axes of graph 500 are meant to be exemplary and non-limiting, and any range of values may be used in measuring the memory latency and available shared cache memory size.

In the example illustrated in FIG. 5 and corresponding with the example illustrated in FIG. 4, the processor cluster 402 has the lowest memory latency when communicating with the execution processor cluster 400 and the second lowest amount of available shared cache memory 450 as depicted by the plot point 502. Similarly, the processor cluster 404 has the second lowest memory latency and the lowest available shared cache memory 452 as depicted by the plot point 504. The processor cluster 406 has the second highest memory latency and the second highest available shared cache memory 454 as depicted by the plot point 506. The processor cluster 408 has the highest memory latency and the highest available shared cache memory 456 as depicted by the plot point 508. In general, a preferred available shared cache memory for use as victim cache for the execution process would have a combination of the lowest memory latency and the highest available shared cache memory size (i.e., closest to the bottom right corner of graph 500). However, the lowest memory latency and the highest available shared cache memory size may not always be available from the available shared cache memory 460, 462, 464, 466. Therefore, various methods may be employed to select the available shared cache memory 460, 462, 464, 466 as a victim cache for the execution process executed by the execution process cluster 500.

In an aspect, a performance speed of each of the processor clusters 402, 404, 406, 408 and their related shared cache memories 452, 454, 456, 458 may be determined based on a combination of performance data. This performance speed may be used to select the available shared cache memory 460, 462, 464, 466 as a victim cache. Such performance data may include memory latencies, such as those illustrated in FIG. 5, adjusted by successful remote shared cache memory accesses. For example, the performance speed of a remote shared cache memory 452, 454, 456, 458 may be determined based on a calculation of a remote shared cache memory hit rate times a processor cluster latency plus a remote shared cache memory miss rate times a main memory latency. The latency of successful accesses of the remote shared cache memory 452, 454, 456, 458 combined with the latency of unsuccessful accesses of the remote shared cache memory 452, 454, 456, 458 may give a performance evaluation of the overall latency/performance speed for using the remote shared cache memory 452, 454, 456, 458. The lower the overall latency for using the remote shared cache memory 452, 454, 456, 458 the more likely the remote shared cache memory 452, 454, 456, 458 may be used as a victim cache to support the execution process executed on the execution processor cluster 400. The performance speed for using the remote shared cache memory 452, 454, 456, 458 may be compared against a threshold or against the performance speed for using another remote shared cache memory 452, 454, 456, 458. In an aspect, the remote shared cache memory hit rate, the processor cluster latency, the remote shared cache memory miss rate, and/or the main memory latency may be measured over a time period, calculated based on historical information, and/or retrieved from storage. The performance data retrieved from storage may be provided during a design and construction phase of the components, or stored previously measured performance data.

Figure 6:
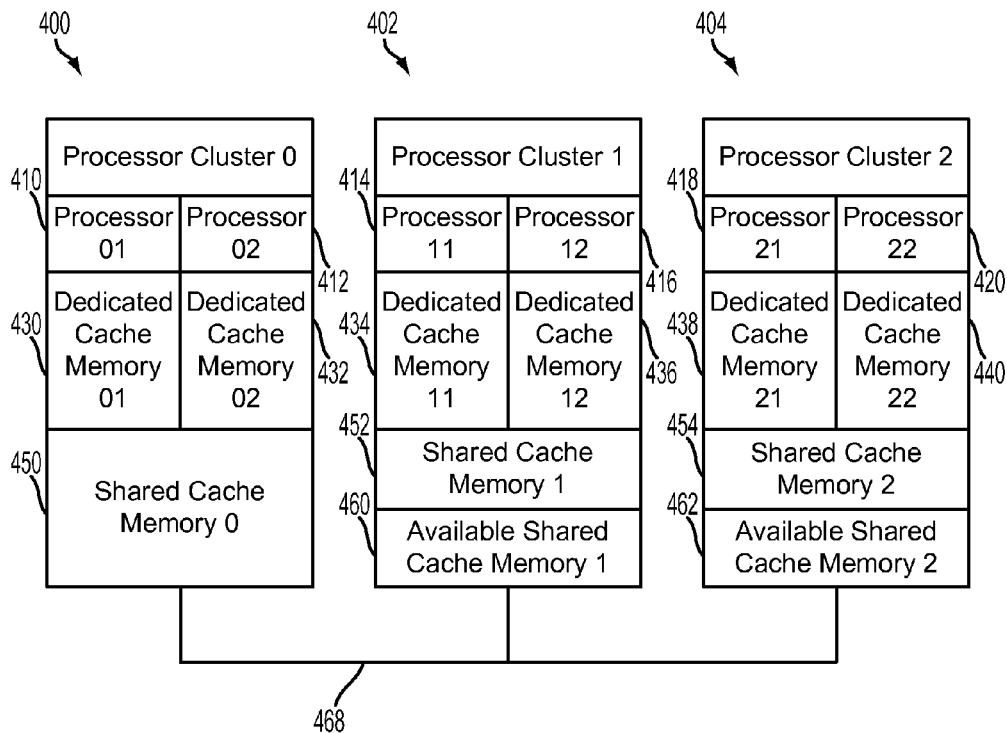
FIG. 6 is an illustration of multiple processor clusters including levels of available shared cache memory for each processor cluster in accordance with an aspect.
Figure 7:
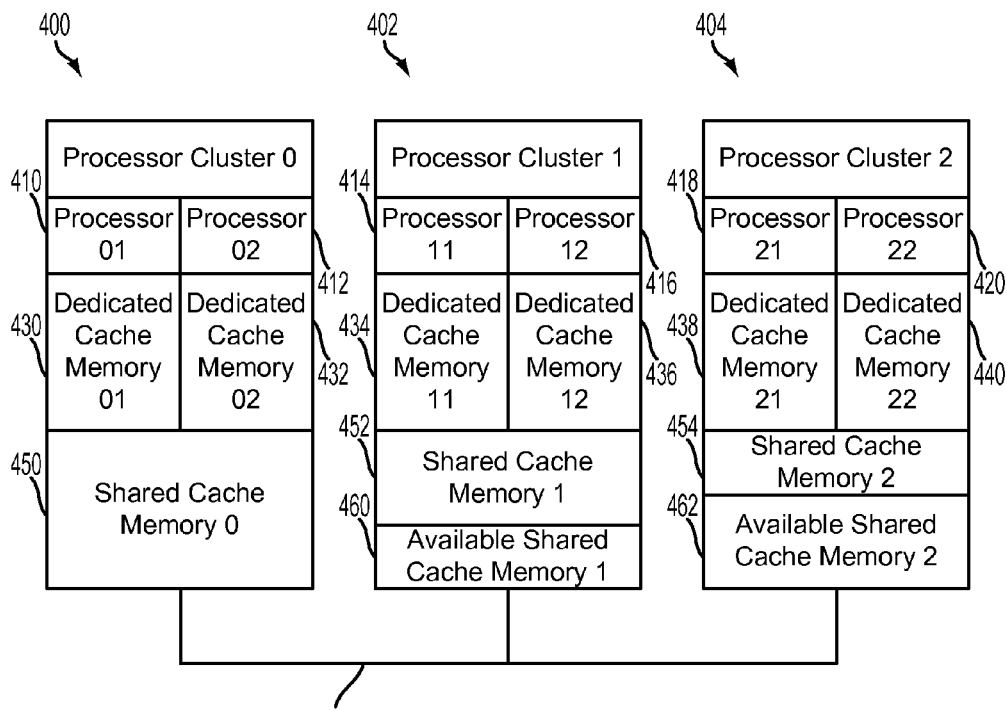
FIG. 7 is an illustration of multiple processor clusters including levels of available shared cache memory for each processor cluster in accordance with an aspect.

FIGS. 6 and 7 illustrate multiple processor clusters 400, 402, 404 including the levels of available shared cache memory 460, 462 for each of the processor clusters 402, 404. The available shared cache memory 460, 462, when used as victim caches, may be used with cache memory address interleaving to increase the effective victim cache size. Cache memory address interleaving may spread the memory addresses used to access the available shared cache memory 460, 462 across the remote shared cache memories 452, 454 such that they may be accessed as a single larger victim cache. This may reduce the likelihood that part of a contiguous request to the remote share cache memories 452, 454 will have to wait for one of the remote shared cache memories 452, 454 to complete a prior portion of the request to complete the contiguous request. Cache memory address interleaving may be implemented across any number of multiple shared cache memories with available shared cache memory. Schemes for cache memory address interleaving may be arbitrary or the schemes may be based on each available shared cache memory size and/or activity on the related processor clusters. These latter schemes may be known as n-way schemes, where n indicates the number of blocks into which the available shared cache memories are divided and n is 2 or greater).

The processor clusters 402, 404 may serve as examples for describing the cache memory address interleaving schemes. The example in FIG. 6 illustrates that the available shared cache memories 460, 462 are of equal or near equal size. In implementing a cache memory address interleaving scheme, the similar sizes of the available shared cache memories 460, 462 are well suited for implementing an arbitrary scheme. In an arbitrary scheme the cache memory addresses may be spread across the available shared cache memories 460, 462 with little to no control other than avoiding overwriting addresses storing wanted data (e.g., a replacement scheme has yet to indicate the stored data can be replaced). The similar sizes of the available shared cache memories 460, 462 makes them simple to manage as a single victim cache because they can be accessed as a single victim cache made of two similarly sized blocks.

Continuing with the example in FIG. 6, an n-way cache memory address interleaving scheme may also be implemented for the similarly sized available shared cache memories 460, 462. In an aspect, the n-way scheme may be based on the size of each of the available shared cache memories 460, 462. While this type of n-way scheme (described further with respect to the example in FIG. 7) may be applied to similarly sized available shared cache memories, it is less likely as the benefits of doing so are not evident.

In an aspect, the n-way scheme may be based on the activity on the processor clusters 402, 404 related to the available shared cache memories 460, 462. For various reasons, such as the demands of a process being executed, the processor clusters 402, 404 may not have the same levels of activity. The disparity of the level of activity between the processor clusters 402, 404 may result in the processor cluster with the higher activity level, for the sake of example the processor cluster 402, having a higher memory latency than the processor cluster with the lower activity level, for example the processor cluster 404. Evenly or arbitrarily spreading the cache memory addresses across the available shared cache memories 460, 462 when there is a disparity in memory latency between them may result in reduced performance speed for executing the execution process. While such interleaving is possible and may increase the effective victim cache size, it may not do so efficiently. Spreading the cache memory addresses across the available shared cache memories 460, 462 according to an n-way scheme based on the activity on the processor clusters 402, 404 may also may increase the effective victim cache size and do so more efficiently. In such an n-way scheme the value of n and the allocation of the number of blocks per the available shared cache memories 460, 462 may be based on the disparity of memory latency between the processor clusters 402, 404. In other words, continuing with the example, the greater the memory latency for the processor cluster 402 in relation to the memory latency for the processor cluster 404, the more often the available shared cache memory 462 should be used in favor over the available shared cache memory 460. In an example, assuming a 7 to 2 ratio of activity between the processor clusters 402, 404 where the higher number shows higher activity and higher memory latency, the value for n may be 9 and the opposite ratio, 2 to 7, may be used for spreading the cache memory addresses to the available shared cache memories 460, 462. As such, during the execution of the execution process, the available shared cache memory 462, with the lower activity and memory latency, and the higher number of spread cache memory address for the victim cache may be accessed more frequently. Any algorithm for deciding how to determine the value for n and the ratio for the spread cache memory addressed across any number of available shared cache memory spaces may be used to implement the n-way scheme based on the activity on any number of processor clusters.

The example in FIG. 7 illustrates that the available shared cache memories 460, 462 are of disparate sizes. In this example the available shared cache memory 460 is smaller than the available shared cache memory 462. The arbitrary cache memory address interleaving scheme may be implemented similarly to the description in relation the example illustrated in FIG. 6. However, the arbitrary scheme may result in a less linear spreading of the cache memory addresses given the potential uneven distribution because of the size disparity. The n-way scheme based on the activity on the processor clusters 402, 404 may also be implemented similarly to the description in relation the example illustrated in FIG. 6.

The n-way cache memory address interleaving scheme based on the size of each of the available shared cache memories 460, 462 may be implemented when the available shared cache memories 460, 462 are disparate in size, as in the example illustrated in FIG. 7. Evenly or arbitrarily spreading the cache memory addresses across the available shared cache memories 460, 462 when there is a disparity in available shared cache memory size between them may result in reduced performance speed for executing the execution process. While such interleaving is possible and may increase the effective victim cache size, it may not do so efficiently. Spreading the cache memory addresses across the available shared cache memories 460, 462 according to an n-way scheme based on the available shared cache memory size may also may increase the effective victim cache size and do so more efficiently. In such an n-way scheme the value of n and the allocation of the number of blocks per the available shared cache memories 460, 462 may be based on the disparity of available shared cache memory space between the processor clusters 402, 404. In other words, continuing with the example, the greater the available shared cache memory space for the processor cluster 404 in relation to the processor cluster 402, the more often the available shared cache memory 462 should be used in favor over the available shared cache memory 460. In an example, assuming a ratio of available shared cache memory size of 1 to 2 between the available shared cache memories 460, 462, where the higher number shows greater available space, the value for n may be 3 and the ratio may be used for spreading the cache memory addresses to the available shared cache memories 460, 462. As such, during the execution of the execution process, the available shared cache memory 462, with greater available shared cache memory space and the higher number of spread cache memory addresses for the victim cache may be accessed more frequently. Any algorithm for deciding how to determine the value for n and the ratio for the spread cache memory addressed across any number of available shared cache memory spaces may be used to implement the n-way scheme based on the available shared cache memory space on any number of processor clusters.

It should be noted that algorithms for using a combination of the size of available shared cache memories and the activity on the processor clusters as the basis of an n-way scheme are also considered.

Figure 8:
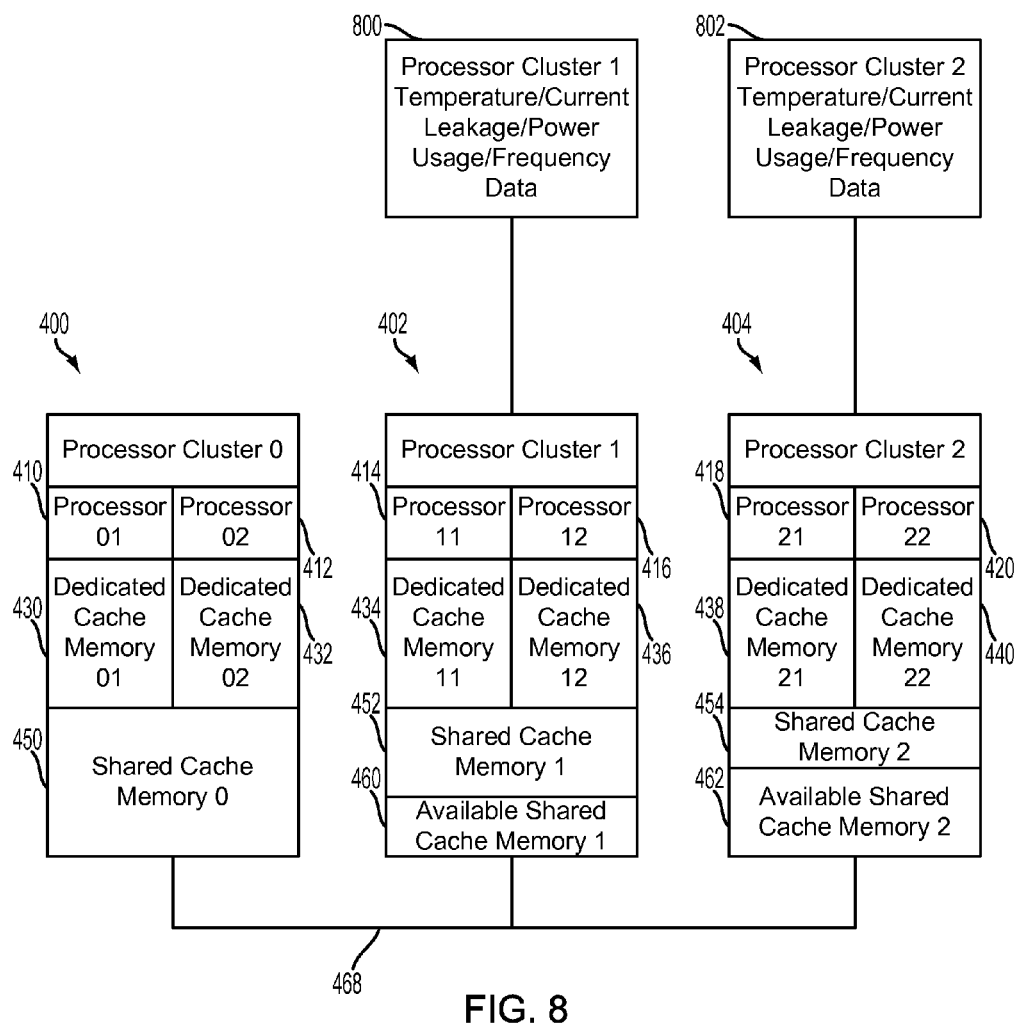
FIG. 8 is an illustration of multiple processor clusters including levels of available shared cache memory for each processor cluster and processor cluster data in accordance with an aspect.

FIG. 8 illustrates multiple processor clusters 400, 402, 404 including data 800, 802 indicating various states of the processor clusters 402, 404 executing threads or processes other than the execution process. The state data 800, 802 may be used to determine the efficiency of operation of each of the processor clusters 402, 404. Selecting victim caches based on their respective efficiencies may reduce the power usage when executing the execution process. The state data 800, 802 may include temperature, current leakage, power usage, and/or operation frequency data for a respective processor cluster 402, 404. Each of the state data 800, 802 may be used to indicate an efficiency of the processor clusters 402, 404. In general higher values for each of the state data 800, 802 indicate that more power is being used to execute a process on the processor clusters 402, 404 in comparison to lower values for each of the state data 800, 802. The lower the value of any one or more the state data 402, 404 for a particular processor clusters 402, 404, the more likely the associated available shared cache memory 460, 462 may be used as a victim cache for the execution process. A determination of the available shared cache memories 460, 462 to be used as victim caches may be based on an algorithm using any one or combination of state data 800, 802 to determine an efficiency of the processor cluster 402, 404. The efficiency of the processor cluster 402, 404 may be compared against a threshold or against the efficiency of another processor cluster 402, 404. In an aspect, the state data 402, 404 may be measured over a time period, calculated based on historical information, and/or retrieved from storage. The state data 402, 404 retrieved from storage may be provided during a design and construction phase of the components, or stored previously measured the state data 402, 404.

Figure 9:
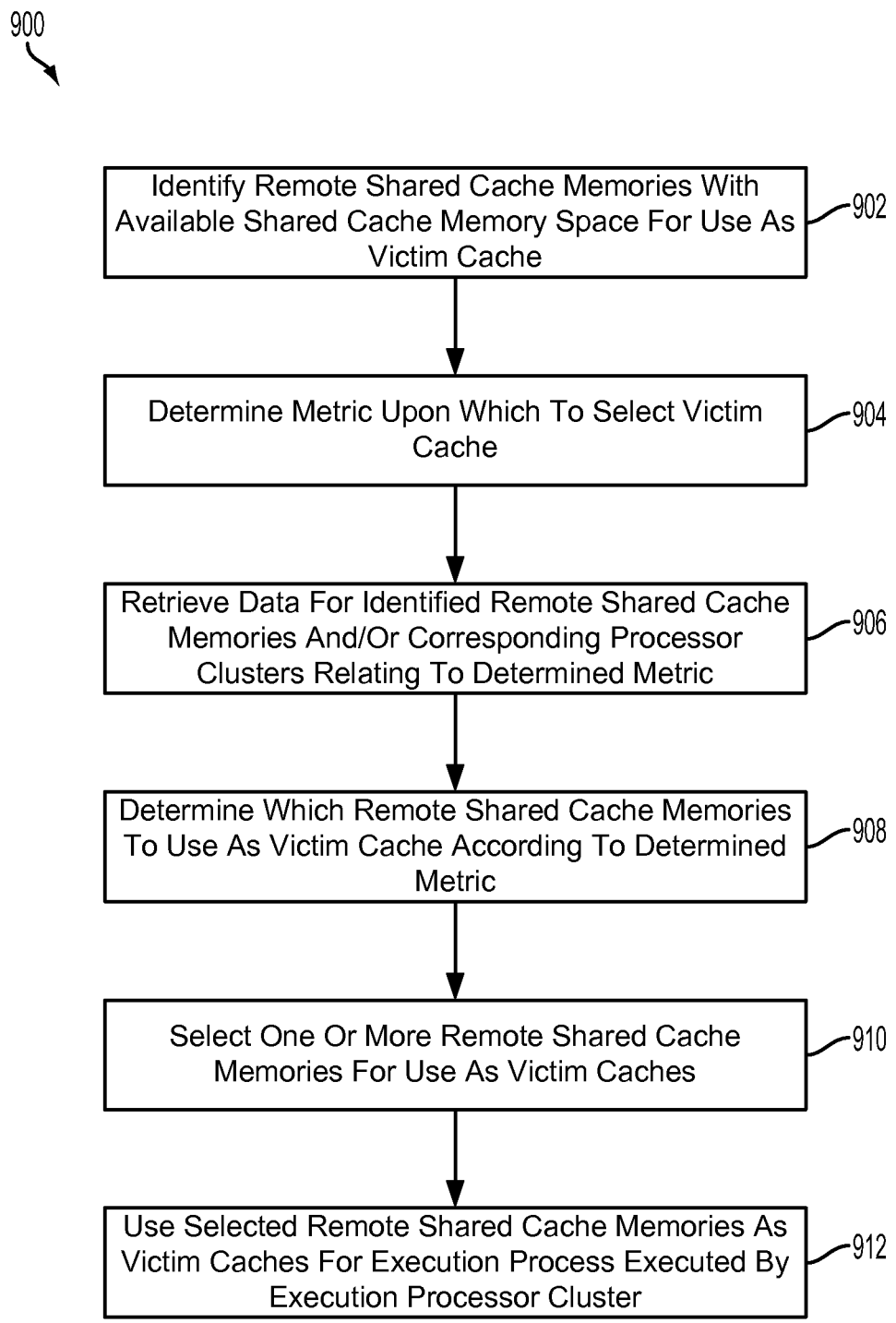
FIG. 9 is process flow diagram illustrating an aspect method for implementing a selection of available remote shared cache memories as victim caches.

FIG. 9 illustrates an aspect method 900 for implementing a selection of remote available shared cache memories as victim caches. The method 900 may be executed in a computing device using software, general purpose or dedicated hardware, such as a processor, or a combination of software and hardware. In block 902 the computing device may identify a remote shared cache memory with available shared cache memory space for use as a victim cache. The identification of such remote shared cache memory may include the determination by the computing device of whether or how much available shared cache memory space is associated with a remote shared cache memory. This may be accomplished by the processor monitoring the hit and/or miss rate of a remote shared cache memory or by checking for available address spaces in a data structure, such as a table, configured to retain such information. Whether a remote shared cache memory is suitable for use as a victim cache may depend on whether the amount of space available in the shared cache memory exceeds a threshold.

In block 904 the computing device may determine a metric upon which to select a remote shared cache memory as a victim cache. As discussed herein, the computing device may consider a performance speed metric, an efficiency metric, and/or an effective victim cache size metric. In an aspect, the computing device may be preprogrammed to use one or more of these metrics exclusively or based on various factors. In an aspect, software running on the computing device, which may include software containing the execution processes, may instruct the computing device as to which metric to use for determining a victim cache. In an aspect, the computing device may determine which metric to use based on a number of factors, including the type and demands of the execution process and/or the states of the computing device.

In block 906 the computing device may retrieve data for the identified remote shared cache memories and/or the corresponding processor clusters relating to the determined metric. As discussed further herein, each of the metrics may involve the use of different data for determining whether a remote shared cache memory may be selected for use as a victim cache. For example, the performance speed metric may use performance data for accessing the remote shared cache memory, the efficiency metric may use efficiency data for the processor cluster associated with the remote shared cache memory, and the effective victim cache size metric may use available shared cache memory space and/or latency data.

In block 908 the computing device may determine which remote shared cache memories to use as the victim cache according to the determined metric. This determination may be made on a comparison of the retrieved data of the identified remote shared cache memories and/or their corresponding processor clusters. In an aspect, comparison of the retrieved data may include comparison of the retrieved data of one remote shared cache memory and/or the corresponding processor cluster against the retrieved data of another or to a threshold to select or reject the remote shared cache memory as a victim cache. In an aspect, comparison of the retrieved data may include comparison of the retrieved data of one remote shared cache memory and/or the corresponding processor cluster may include calculations using the retrieved data to determine a value for the comparison.

In block 910 the computing device may select one or more of the remote shared cache memories for use as the victim cache. The selection of a remote shared cache memory for use as a victim cache may result from a favorable outcome of the comparison in block 908. In block 912 the computing device may use the selected remote shared cache memories as the victim cache for the execution process executed by the execution processor cluster.

Figure 10:
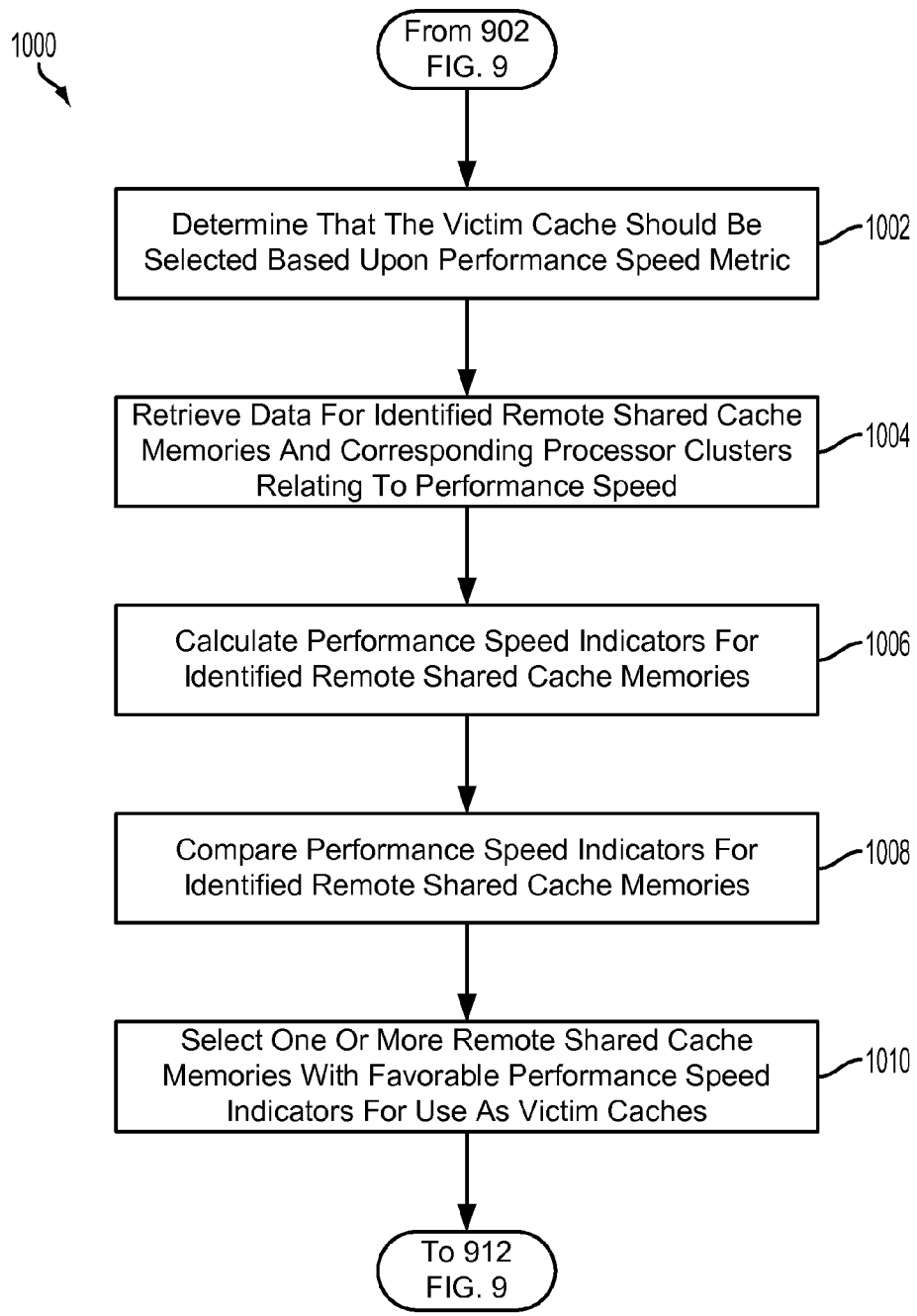
FIG. 10 is process flow diagram illustrating an aspect method for implementing a selection of available remote shared cache memories as victim caches according to a performance speed metric.

FIG. 10 illustrates an aspect method 1000 for implementing a selection of available remote shared cache memories as victim caches according to a performance speed metric. The method 1000 may be executed in a computing device using software, general purpose or dedicated hardware, such as a processor, or a combination of software and hardware. The blocks of the method 1000 may provide greater detail of blocks 904, 906, 908, 910 of FIG. 9. In block 1002 the computing device may determine that the victim cache should be selected based upon a performance speed metric. As discussed herein, the determination to select a victim cache upon a performance speed metric may be preprogrammed, provided by instruction from the software running on the computing device, which may include the software containing the execution processes, and/or may be based on a number of factors, including the type and demands of the execution process and/or the states of the computing device.

In block 1004 the computing device may retrieve data for the identified remote shared cache memories and corresponding processor clusters relating to performance speed. As discussed herein, this data relating to the performance speed may include the remote shared cache memory hit rate, the processor cluster latency, the remote shared cache memory miss rate, and the main memory latency. Retrieving the performance speed data may include measuring the performance speed data over a time period, calculating the performance speed data based on historical information, and/or retrieving the performance speed data from storage.

In block 1006 the computing device may calculate performance speed indicators for the identified remote shared cache memories. The performance speed indicators may be used to identify performance speed levels of the identified remote shared cache memories. In aspect, calculating the performance speed indicators may involve executing the following equation: remote shared cache memory hit rate times a processor cluster latency plus a remote shared cache memory miss rate times a main memory latency. The performance speed indicator may be indicative of the overall latency of accessing an identified remote shared cache memory.

In block 1008 the computing device may compare the performance speed indicators for the identified remote shared cache memories. In an aspect, this comparison may be implemented against a threshold. In an aspect, this comparison may be implemented against the performance speed indicator of another identified remote shared cache memory. In block 1010 the computing device may select one or more remote shared cache memories with favorable performance speed indicators, based on the comparison in block 1008, for use as victim caches. As discussed in further detail with reference to FIG. 12, in an aspect of method 1000 the computing device may determine an address interleaving scheme based on data of identified remote shared cache memories relating to an effective victim cache, performance speed, efficiency, and/or size of the multiple remote shared cache memories. The determination regarding the cache memory address interleaving scheme to implement may depend on a ratio of performance speed, efficiency, memory latency and/or available shared cache memory size between the identified remote shared cache memories. The computing device may apply the cache memory address interleaving scheme to the multiple remote shared cache memories selected in block 1010. The computing device may use the selected remote shared cache memories as the victim cache for the execution process executed by the execution processor cluster in block 912.

Figure 11:
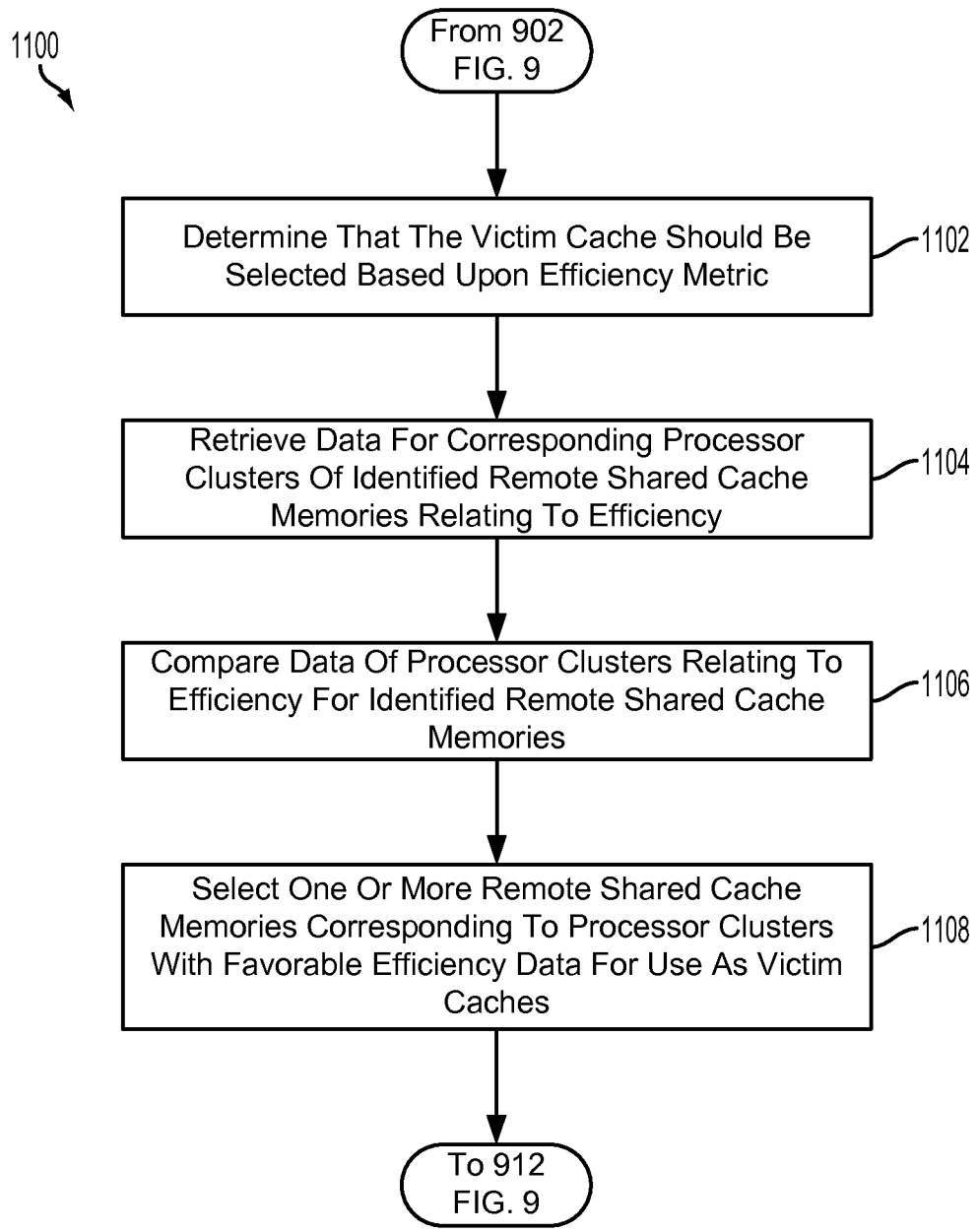
FIG. 11 is process flow diagram illustrating an aspect method for implementing a selection of available remote shared cache memories as victim caches according to an efficiency metric.

FIG. 11 illustrates an aspect method 1100 for implementing a selection of available remote shared cache memories as victim caches according to an efficiency metric. The method 1100 may be executed in a computing device using software, general purpose or dedicated hardware, such as a processor, or a combination of software and hardware. The blocks of the method 1100 may provide greater detail of blocks 904, 906, 908, 910 of FIG. 9. In block 1102 the computing device may determine that the victim cache should be selected based upon an efficiency metric. As discussed herein, the determination to select a victim cache upon an efficiency metric may be preprogrammed, provided by instruction from the software running on the computing device, which may include the software containing the execution processes, and/or may be based on a number of factors, including the type and demands of the execution process and/or the states of the computing device.

In block 1104 the computing device may retrieve data for the corresponding processor clusters of the identified remote shared cache memories relating to efficiency. As discussed herein, this data relating to efficiency may include the state data of the processor clusters, including temperature, current leakage, power usage, and/or operation frequency. Retrieving the state data may include measuring the state data over a time period, calculating the state data based on historical information, and/or retrieving the state data from storage.

In block 1106 the computing device may compare state data of the processor clusters relating to efficiency for the identified remote shared cache memories. The state data may be used to identify efficiency levels of the processor clusters correlated with the identified remote shared cache memories. In an aspect, this comparison may be implemented against a threshold. In an aspect, this comparison of the state data of a processor cluster correlated with the identified remote shared cache memory may be implemented against the state data of another processor cluster correlated with the identified remote shared cache memory. In block 1108 the computing device may select one or more remote shared cache memories corresponding to one or more processor cores with favorable performance efficiency data, based on the comparison in block 1006, for use as victim caches.

As discussed in further detail with reference to FIG. 12, in an aspect of method 1100 the computing device may determine an address interleaving scheme based on data of identified remote shared cache memories relating to an effective victim cache, performance speed, efficiency, and/or size of the multiple remote shared cache memories. The determination regarding the cache memory address interleaving scheme to implement may depend on a ratio of performance speed, efficiency, memory latency and/or available shared cache memory size between the identified remote shared cache memories. The computing device may apply the cache memory address interleaving scheme to the multiple remote shared cache memories selected in block 1106. The computing device may use the selected remote shared cache memories as the victim cache for the execution process executed by the execution processor cluster in block 912.

Figure 12:
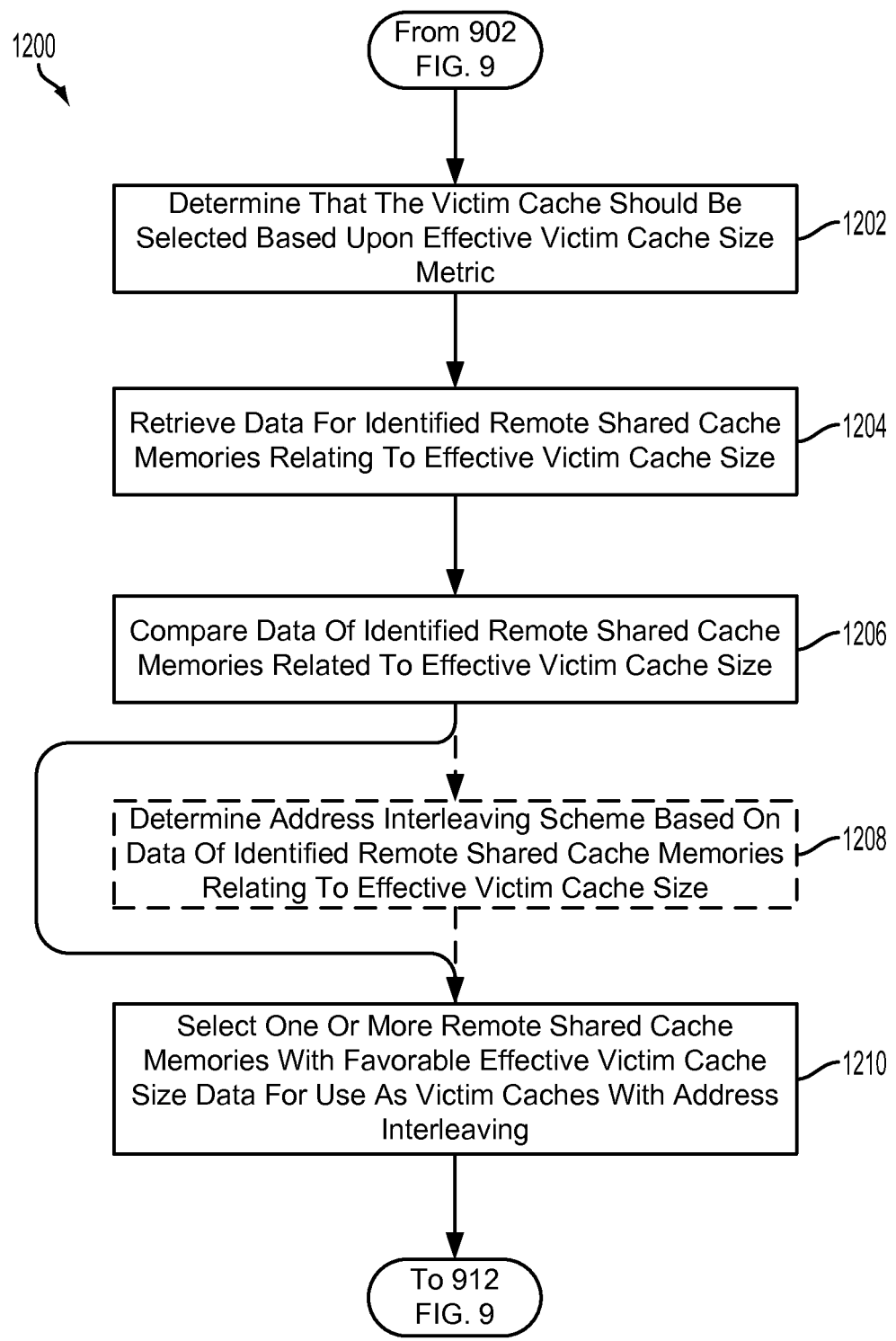
FIG. 12 is process flow diagram illustrating an aspect method for implementing a selection of available remote shared cache memories as victim caches according to an effective victim cache size metric.

FIG. 12 illustrates an aspect method 1200 for implementing a selection of available remote shared cache memories as victim caches according to an effective victim cache size metric. The method 1200 may be executed in a computing device using software, general purpose or dedicated hardware, such as a processor, or a combination of software and hardware. The blocks of the method 1200 may provide greater detail of blocks 904, 906, 908, 910 of FIG. 9. In block 1202 the computing device may determine that the victim cache should be selected based upon an effective victim cache size metric. As discussed herein, the determination to select a victim cache upon an effective victim cache size metric may be preprogrammed, provided by instruction from the software running on the computing device, which may include the software containing the execution processes, and/or may be based on a number of factors, including the type and demands of the execution process and/or the states of the computing device.

In block 1204 the computing device may retrieve data for the identified remote shared cache memories relating to effective victim cache size. As discussed herein, this data relating to effective victim cache size may include the available shared cache memory size of the identified remote shared cache memories and/or the memory latency for the identified remote shared cache memories. Retrieving the state data may include measuring the state data over a time period, calculating the state data based on historical information, and/or retrieving the state data from storage. In block 1206 the computing device may compare data of the identified remote shared cache memories related to the effective victim cache size. In an aspect, this comparison may be implemented against a threshold. In an aspect, this comparison of the data of one identified remote shared cache memory related to the effective victim cache size may be implemented against data of another identified remote shared cache memory related to the effective victim cache size.

In optional block 1208 the computing device may determine an address interleaving scheme based on the data of identified remote shared cache memories relating to effective victim cache size. In an aspect, the address interleaving scheme may include arbitrary or n-way, symmetrical or asymmetrical, cache memory address interleaving schemes. The arbitrary cache memory address interleaving scheme may assign addresses of the victim cache to the identified remote shared cache memories with little or no constraint. The n-way symmetrical cache memory address interleaving scheme may assign addresses of the victim cache to the identified remote shared cache memories on a even distribution basis among the identified remote shared cache memories. The n-way asymmetrical cache memory address interleaving scheme may assign addresses of the victim cache to the identified remote shared cache memories on an uneven distribution basis among the identified remote shared cache memories. The determination as to which cache memory address interleaving scheme to implement may depend on the ratio of performance speed, efficiency, memory latency and/or available shared cache memory size between the identified remote shared cache memories.

In block 1210 the computing device may select one or more remote shared cache memories with favorable effective victim cache size data, based on the comparison in block 1206, for use as victim caches with address interleaving. In an aspect, the cache memory address interleaving scheme may be determined in optional block 1208. In an aspect, the cache memory address interleaving scheme may be preprogrammed and/or provided by instruction from the software running on the computing device, which may include the software containing the execution processes. The computing device may use the selected remote shared cache memories as the victim cache for the execution process executed by the execution processor cluster in block 912.

Figure 13:
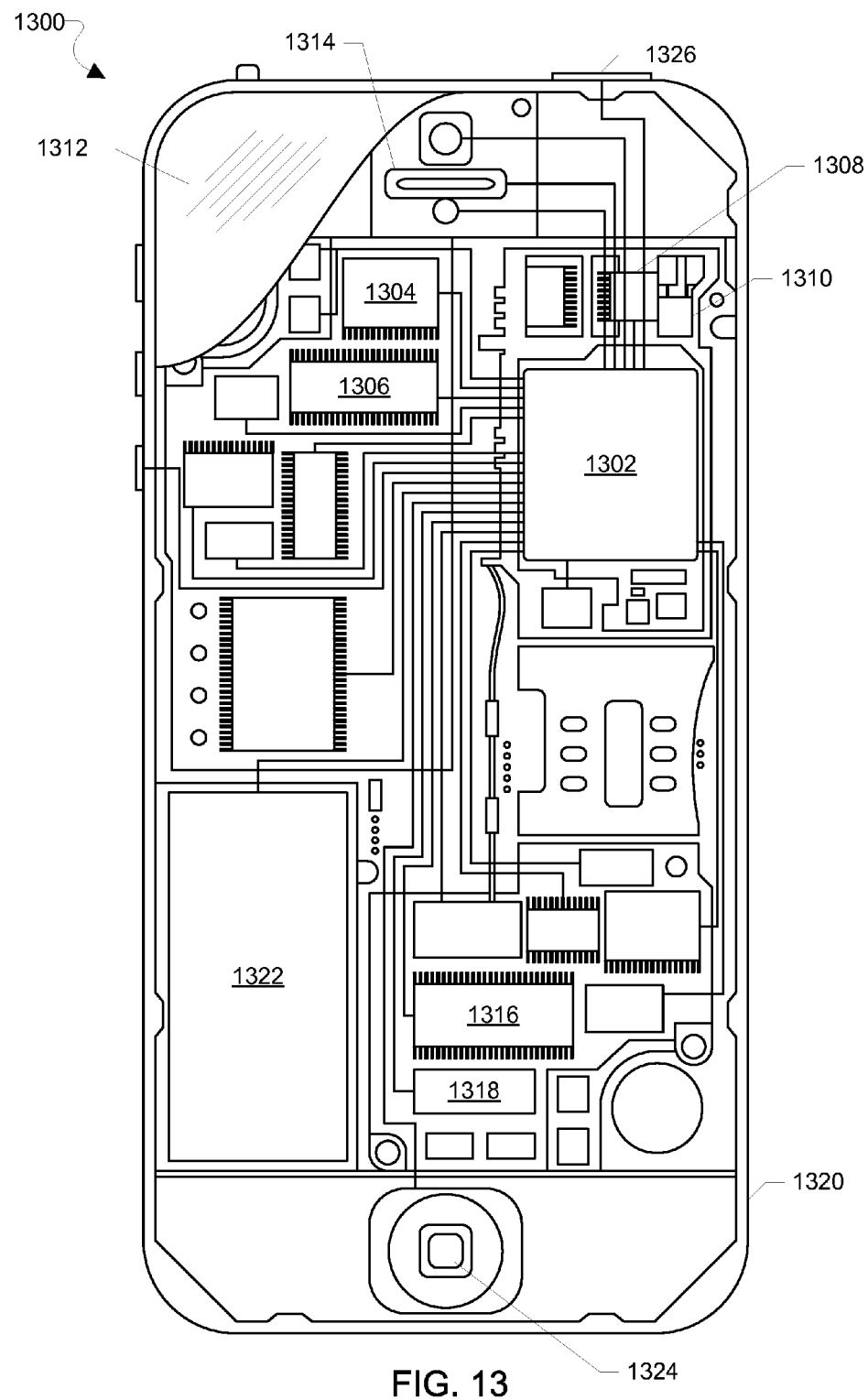
FIG. 13 is component block diagram illustrating an example mobile computing device suitable for use with the various aspects.

The various aspects (including, but not limited to, aspects discussed above with reference to FIGS. 1-12) may be implemented in a wide variety of computing systems, which may include an example mobile computing device suitable for use with the various aspects illustrated in FIG. 13. The mobile computing device 1300 may include a processor 1302 coupled to a touchscreen controller 1304 and an internal memory 1306. The processor 1302 may be one or more multicore integrated circuits designated for general or specific processing tasks. The internal memory 1306 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the computing device 1300 need not have touch screen capability.

The mobile computing device 1300 may have one or more radio signal transceivers 1308 (e.g., Peanut, Bluetooth, Zigbee, Wi-Fi, RF radio) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile computing device 1300 may include a cellular network wireless modem chip 1316 that enables communication via a cellular network and is coupled to the processor.

The mobile computing device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

The mobile computing device 1300 may also include speakers 1314 for providing audio outputs. The mobile computing device 1300 may also include a housing 1320, constructed of a plastic, metal, or a combination of materials, for containing all or some of the components discussed herein. The mobile computing device 1300 may include a power source 1322 coupled to the processor 1302, such as a disposable or rechargeable battery. The rechargeable battery may also be coupled to the peripheral device connection port to receive a charging current from a source external to the mobile computing device 1300. The mobile computing device 1300 may also include a physical button 1324 for receiving user inputs. The mobile computing device 1300 may also include a power button 1326 for turning the mobile computing device 1300 on and off.

Figure 14:
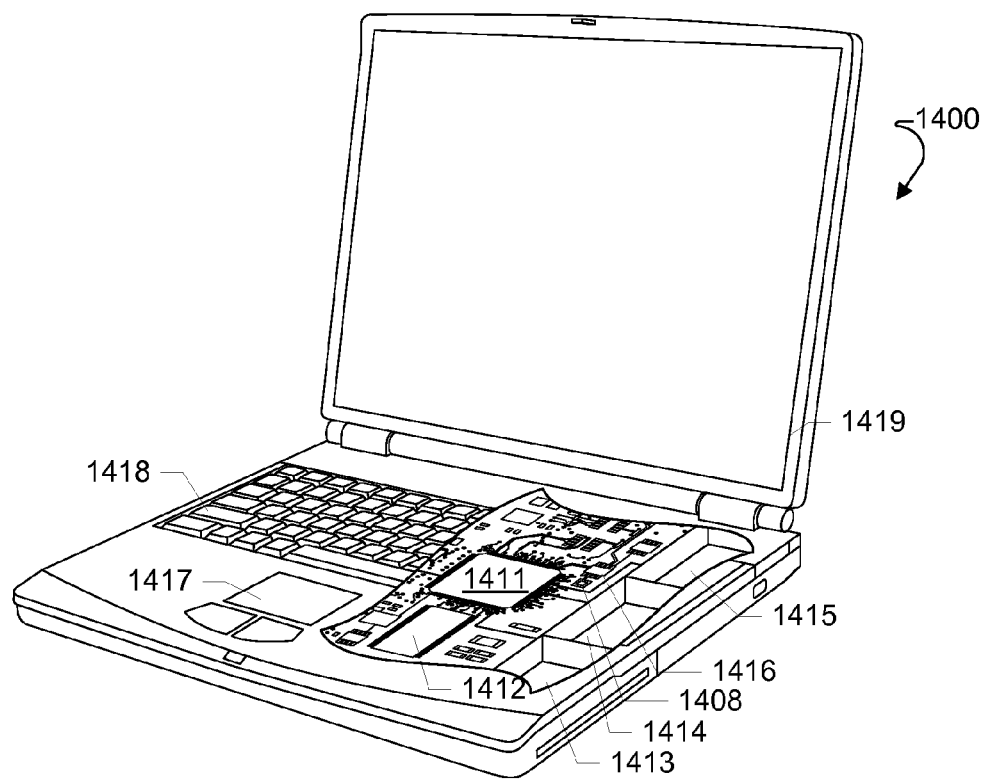
FIG. 14 is component block diagram illustrating an example mobile computing device suitable for use with the various aspects.

The various aspects (including, but not limited to, aspects discussed above with reference to FIGS. 1-12) may be implemented in a wide variety of computing systems, which may include a variety of mobile computing devices, such as a laptop computer 1400 illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be used in conjunction with the various aspects.

Figure 15:
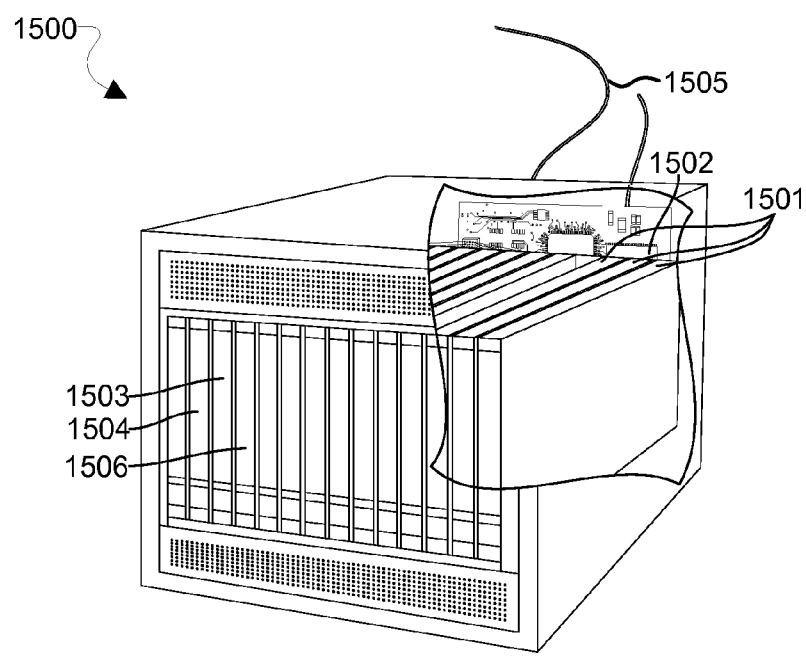
FIG. 15 is component block diagram illustrating an example server suitable for use with the various aspects.

The various aspects (including, but not limited to, aspects discussed above with reference to FIGS. 1-12) may be implemented in a wide variety of computing systems, which may include any of a variety of commercially available servers for compressing data in server cache memory. An example server 1500 is illustrated in FIG. 15. Such a server 1500 typically includes one or more multi-core processor assemblies 1501 coupled to volatile memory 1502 and a large capacity nonvolatile memory, such as a disk drive 1504. As illustrated in FIG. 15, multi-core processor assemblies 1501 may be added to the server 1500 by inserting them into the racks of the assembly. The server 1500 may also include a floppy disc drive, compact disc (CD) or DVD disc drive 1506 coupled to the processor 1501. The server 1500 may also include network access ports 1503 coupled to the multi-core processor assemblies 1501 for establishing network interface connections with a network 1505, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of selecting from among a plurality of shared cache memories a remote shared cache memory to use as a victim cache, comprising:
    identifying among the plurality of shared cache memories those remote shared cache memories with space available for use as the victim cache;
    retrieving, for each of the identified remote shared cache memories or a processor cluster associated with each of the identified remote shared cache memories, data relating to a metric for selecting a remote shared cache memory as the victim cache, wherein the data includes a hit rate of the identified remote shared cache memory, a miss rate for the identified remote shared cache memory, a latency of the processor cluster, and a latency for a main memory;
    determining a suitability of each of the identified remote shared cache memories for use as the victim cache based on the metric; and
    selecting one of the identified remote shared cache memories to use as the victim cache based on the determination.

2. The method of claim 1, wherein:
    the metric for selecting a remote shared cache memory as the victim cache comprises a performance speed metric;
    determining a suitability of each of the identified remote shared cache memories for use as the victim cache based on the metric comprises:
        calculating a performance speed indicator for the identified remote shared cache memory; and
        comparing the performance speed indicator for the identified remote shared cache memory to a threshold or another performance speed indicator for another identified remote shared cache memory.

3. The method of claim 2, further comprising interleaving memory addresses of the identified remote shared cache memory selected for use as the victim cache with another remote shared cache memory selected for use as the victim cache based on an address interleaving scheme.

4. The method of claim 2, wherein calculating a performance speed indicator for the identified remote shared cache memory comprises using the equation: the hit rate of the identified remote shared cache memory times the latency of the processor cluster plus the miss rate of the identified remote shared cache memory times the latency of the main memory.

5. A computing device, comprising:
    a plurality of processor clusters communicatively connected to each other;
    a first processor cluster of the plurality of processor clusters assigned an execution process;
    a plurality of shared cache memories each communicatively connected to at least one of the plurality of processor clusters;
    a main memory communicatively connected to a processor; and
    the processor communicatively connected to the plurality of processor clusters and configured with processor-executable instructions to perform operations comprising:
        identifying among the plurality of shared cache memories those remote shared cache memories with space available for use as a victim cache;
        retrieving, for each of the identified remote shared cache memories or a processor cluster associated with each of the identified remote shared cache memories, data relating to a metric for selecting a remote shared cache memory as the victim cache, wherein the data includes a hit rate of the identified remote shared cache memory, a miss rate for the identified remote shared cache memory, a latency of the processor cluster, and a latency for the main memory;
        determining a suitability of each of the identified remote shared cache memories for use as the victim cache based on the metric; and
        selecting one of the identified remote shared cache memories to use as the victim cache based on the determination.

6. The computing device of claim 5, wherein:
    the metric for selecting a remote shared cache memory as the victim cache comprises a performance speed metric; and
    the processor is further configured with processor-executable instructions to perform operations such that determining a suitability of each of the identified remote shared cache memories for use as the victim cache based on the metric comprises:
        calculating a performance speed indicator for the identified remote shared cache memory; and
        comparing the performance speed indicator for the identified remote shared cache memory to a threshold or another performance speed indicator for another identified remote shared cache memory.

7. The computing device of claim 6, wherein the processor is further configured with processor-executable instructions to perform operations comprising interleaving memory addresses of the identified remote shared cache memory selected for use as the victim cache with another remote shared cache memory selected for use as the victim cache based on an address interleaving scheme.

8. The computing device of claim 6, wherein the processor is further configured with processor-executable instructions to perform operations such that calculating a performance speed indicator for the identified remote shared cache memory comprises using the equation: the hit rate of the identified remote shared cache memory times the latency of the processor cluster plus the miss rate of the identified remote shared cache memory times the latency of the main memory.

9. A computing device, comprising:
means for identifying among a plurality of shared cache memories those remote shared cache memories with space available for use as a victim cache;
means for retrieving, for each of the identified remote shared cache memories or a processor cluster associated with each of the identified remote shared cache memories, data relating to a metric for selecting a remote shared cache memory as the victim cache, wherein the data includes a hit rate of the identified remote shared cache memory, a miss rate for the identified remote shared cache memory, a latency of the processor cluster, and a latency for a main memory;
means for determining a suitability of each of the identified remote shared cache memories for use as the victim cache based on the metric; and
means for selecting one of the identified remote shared cache memories to use as the victim cache based on the determination.

10. The computing device of claim 9, wherein:
the metric for selecting a remote shared cache memory as the victim cache comprises a performance speed metric; and
means for determining a suitability of each of the identified remote shared cache memories for use as the victim cache based on the metric comprises:
means for calculating a performance speed indicator for the identified remote shared cache memory; and
means for comparing the performance speed indicator for the identified remote shared cache memory to a threshold or another performance speed indicator for another identified remote shared cache memory.

11. The computing device of claim 10, further comprising means for interleaving memory addresses of the identified remote shared cache memory selected for use as the victim cache with another remote shared cache memory selected for use as the victim cache based on an address interleaving scheme.

12. The computing device of claim 10, wherein means for calculating a performance speed indicator for the identified remote shared cache memory comprises means for using the equation: the hit rate of the identified remote shared cache memory times the latency of the processor cluster plus the miss rate of the identified remote shared cache memory times the latency of the main memory.

13. A non-transitory processor-readable medium having stored thereon processor-executable instructions configured to cause a processor to perform operations comprising:
identifying among a plurality of shared cache memories those remote shared cache memories with space available for use as a victim cache;
retrieving, for each of the identified remote shared cache memories or a processor cluster associated with each of the identified remote shared cache memories, data relating to a metric for selecting a remote shared cache memory as the victim cache, wherein the data includes a hit rate of the identified remote shared cache memory, a miss rate for the identified remote shared cache memory, a latency of the processor cluster, and a latency for a main memory;
determining a suitability of each of the identified remote shared cache memories for use as the victim cache based on the metric; and
selecting one of the identified remote shared cache memories to use as the victim cache based on the determination.

14. The non-transitory processor-readable medium of claim 13, wherein:
the metric for selecting a remote shared cache memory as the victim cache comprises a performance speed metric; and
the stored processor-executable instructions are configured to cause the processor to perform operations such that
determining a suitability of each of the identified remote shared cache memories for use as the victim cache based on the metric comprises:
calculating a performance speed indicator for the identified remote shared cache memory; and
comparing the performance speed indicator for the identified remote shared cache memory to a threshold or another performance speed indicator for another identified remote shared cache memory.

15. The non-transitory processor-readable medium of claim 14, wherein the stored processor-executable instructions are configured to cause the processor to perform operations such that calculating a performance speed indicator for the identified remote shared cache memory comprises using the equation: the hit rate of the identified remote shared cache memory times the latency of the processor cluster plus the miss rate of the identified remote shared cache memory times the latency of the main memory.

16. The non-transitory processor-readable medium of claim 14, wherein the stored processor-executable instructions are configured to cause the processor to perform operations further comprising interleaving memory addresses of the identified remote shared cache memory selected for use as the victim cache with another remote shared cache memory selected for use as the victim cache based on an address interleaving scheme.

* * * * *